(No Model.)
E. HEYDE.
SAW MILL CARRIAGE.
No. 350,742. Patented Oct. 12, 1886.
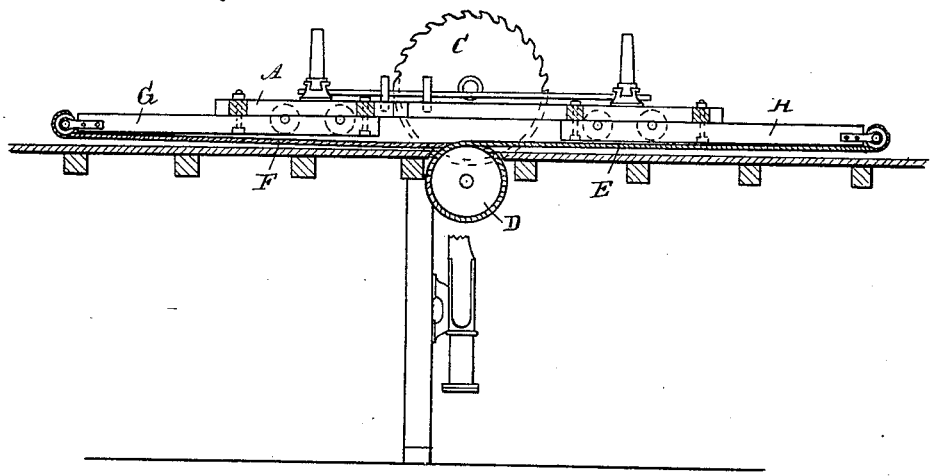
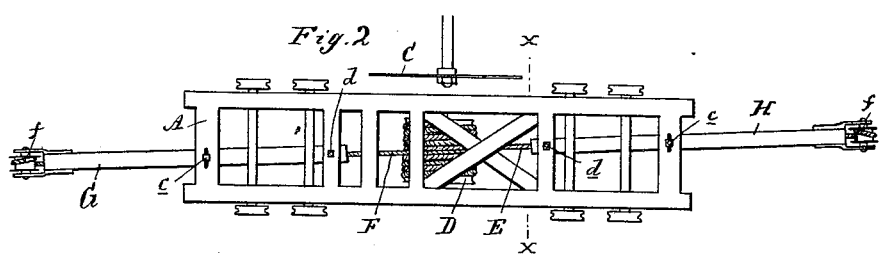
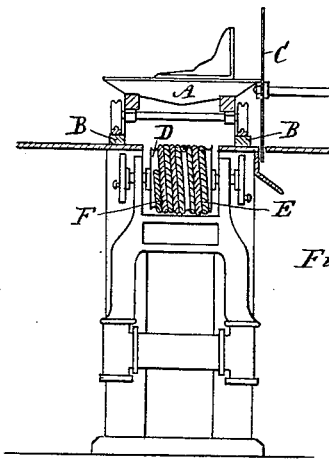
Attest:
John Schuman.
Inventor:
Edward Heyde.
by his Atty
Thos. S. Sprague

UNITED STATES PATENT OFFICE.

EDWARD HEYDE, OF EAST SAGINAW, MICHIGAN.

SAW-MILL CARRIAGE.

SPECIFICATION forming part of Letters Patent No. 350,742, dated October 12, 1886.

Application filed May 10, 1886. Serial No. 201,631. (No model.)

*To all whom it may concern:*

Be it known that I, EDWARD HEYDE, of East Saginaw, in the county of Saginaw and State of Michigan, have invented a new and useful Improvement in Saw-Mill Carriages; and I do hereby declare that the following is a full, clear, and exact description thereof, reference being had to the accompanying drawings, which form a part of this specification.

This invention relates to a new and useful improvement in feed mechanism for saw-mill carriages; and my invention belongs to that class of feed mechanism in which the carriage is operated by means of ropes wound upon drums rotated by a stationary engine; and my improvement consists in attaching the carriage directly to one end of the ropes, instead of passing the ropes around sheaves secured at the ends of the track, as is done now.

To this end my improved feed mechanism is constructed and arranged as described in the following specification, and shown in the accompanying drawings, in which—

Figure 1 is a side elevation of a saw-mill carriage to which my feed mechanism is applied. Fig. 2 is a plan thereof, and Fig. 3 is a cross-section on line $x\ x$ in Fig. 2.

A represents a saw-mill carriage arranged to travel on ways B, in the usual manner for feeding the log to the saw C. Below the floor, and at right angles to the travel of the carriage, is journaled in suitable bearings the spirally-grooved drum D, to which are secured the inner ends of two ropes, E F, the opposite ends of which are secured, respectively, to the outer ends of two outriggers, G H, secured to the carriage, and projecting some distance beyond the opposite ends of the carriage. These outriggers are secured to the carriage adjustably in any suitable way—such as shown in the drawings, wherein suitable slots are formed for the bolts $c$ or $d$, which secure said outriggers to the carriage, to permit of changing the angle of the ropes to the line of motion, while any slack in the ropes may be taken up by means of the rolls $f$, secured to the free ends of the outriggers.

In practice the outriggers are made sufficiently long to obtain the required length of travel for the carriage when the drum is revolved alternately in opposite directions by means of the drive mechanism and reversing-gear, which may be of any description used heretofore in similar feed mechanism. By attaching the ropes near the opposite ends of the drums, and causing them to wind and unwind in the manner shown, no undue strain or slack nor chafing will be produced in the ropes, while at the same time the carriage during the feeding will cause the log to hug the saw, and during the return motion cause it to fall away from the saw. It is obvious that any kind of rigid extension of the frame of the carriage partakes of the nature of my outriggers if used for a like purpose.

The adjustability of the outriggers is advantageous in so far that it permits of adjusting the angularity of the ropes, so that they will wind and unwind in a like degree; but it is clear that other means of adjustment for obtaining this object may be provided.

The advantage of my improved feed-motion lies in its simplicity, its saving in power, owing to the directions of transmitting the motion, its economy in the required length of rope, and its saving in the wear of the ropes.

What I claim as my invention is—

1. In a feed mechanism for saw-mill carriages, the combination of a rotating drum, of a saw-mill carriage having extensions or outriggers upon the ends secured to the frame diagonally thereto, as shown, and of two ropes having their outer ends secured to the ends of said extensions or outriggers and their inner ends secured to the rotating drum, substantially as described.

2. In a feed mechanism for saw-mill carriages wherein the reciprocating motion of the carriage is produced by a rotating drum and rope-connection between the drum and carriage, outriggers or extensions secured to the ends of the carriage-frame, and extending diagonally lengthwise of the frame in the same line, as a means for obtaining the required travel of the carriage by direct rope-connection between the drum and the carriage, substantially as described.

3. In a feed mechanism for saw-mill carriages, the combination of the carriage, the outriggers secured to the ends thereof diagonally to the length thereof, the rotating drum, and the ropes E F, secured to the ends of the outriggers and to the rotating drum, substantially as described.

4. In combination with the saw-carriage and its feed mechanism, the outriggers G H, secured to the saw-carriage, and adjustable laterally thereon, for the purpose of adjusting the angularity of the ropes, substantially as described.

5. The combination, with the carriage A, ways B, and spirally-grooved drum D, of the outriggers G H, pivotally secured to the carriage-frame at their inner ends, the pulleys $f$ at their outer ends, the bolts $c$, passed through the outriggers and slots in the carriage-frame, and the ropes E F, having their inner ends secured to the drum D and their outer ends to the outer ends of the outriggers, substantially as and for the purpose specified.

EDWARD HEYDE.

Witnesses:
G. H. RUPLEY,
A. GOLDIE.